(12) United States Patent
Sheeks et al.

(10) Patent No.: US 11,402,525 B2
(45) Date of Patent: Aug. 2, 2022

(54) EARTHQUAKE DETECTOR

(71) Applicants: Kenneth H Sheeks, Pioneer, CA (US); Thomas L Wood, Kaneohe, HI (US); Sandra L Ragley, Kaneohe, HI (US)

(72) Inventors: Kenneth H Sheeks, Pioneer, CA (US); Thomas L Wood, Kaneohe, HI (US); Sandra L Ragley, Kaneohe, HI (US)

(*) Notice: Subject to any disclaimer, the term of this patent is extended or adjusted under 35 U.S.C. 154(b) by 0 days.

(21) Appl. No.: 17/083,522

(22) Filed: Oct. 29, 2020

(65) Prior Publication Data

US 2021/0141108 A1 May 13, 2021

Related U.S. Application Data

(60) Provisional application No. 62/933,472, filed on Nov. 10, 2019.

(51) Int. Cl.
| | |
|---|---|
| *G01V 1/00* | (2006.01) |
| *G01P 15/09* | (2006.01) |
| *G01V 1/18* | (2006.01) |
| *G08B 21/10* | (2006.01) |
| *G08B 29/24* | (2006.01) |
| *G08B 3/10* | (2006.01) |
| *G08B 5/36* | (2006.01) |

(52) U.S. Cl.
CPC .......... *G01V 1/008* (2013.01); *G01P 15/0907* (2013.01); *G01V 1/18* (2013.01); *G08B 21/10* (2013.01); *G08B 29/24* (2013.01); *G08B 3/10* (2013.01); *G08B 5/36* (2013.01)

(58) Field of Classification Search
CPC ...... G01V 1/008; G01V 1/18; G01P 15/0907; G08B 21/10; G08B 29/24
USPC .......................................................... 702/15
See application file for complete search history.

(56) References Cited

U.S. PATENT DOCUMENTS

| | | | | |
|---|---|---|---|---|
| 2016/0011325 A1* | 1/2016 | Taya | ...... | G01V 1/303 |
| | | | | 702/15 |
| 2021/0356612 A1* | 11/2021 | Kendall | ......... | G01V 1/008 |

* cited by examiner

*Primary Examiner* — Michael P Nghiem
(74) *Attorney, Agent, or Firm* — Craig A. Simmermon

(57) ABSTRACT

Earthquake detector is a solid-state device that detects the motion of a building or structure and initiates an alarm when the motion of a building or structure rises above a certain base level or threshold level of motion that is automatically calibrated or manually entered for the specific building or structure and the specific location of the building or structure. Earthquake detector measures the amplitude of movement and the magnitude of acceleration of the actual building or structure caused by a seismic event, earthquake, or other external force because this is the primary cause of damage to the building or structure and the associated potential for collapse of the building or structure. Earthquake detector has a circuit board; a microprocessor, integrated circuit, or chip; an accelerometer integrated circuit or chip; an alarm module; a connection to a power source; and a calibration control.

6 Claims, 6 Drawing Sheets

EARTHQUAKE DETECTOR

BACKGROUND OF THE INVENTION

1. Field of the Invention

This invention relates to an earthquake detector. More particularly, this invention relates to an alarm system that detects the occurrence of a seismic event or earthquake and relays an alarm to building occupants in order to provide adequate warning and contribute to minimizing injuries and/or loss of life. The alarm signals building occupants to quickly exit the building or quickly take cover within the building, noting that the vast majority of all fatalities caused by earthquakes result from failures of a building or structure or collapse of a building or structure.

2. Description of Related Art

There are other earthquake detectors or sensors in the prior art. Most use a pendulum-based sensor to detect seismic waves in the earth's crust, which could be: i) compressional or longitudinal waves or ii) shear or transverse waves in the earth's crust. Most prior art earthquake detectors or sensors measure the movement of the earth's crust.

The present invention instead focuses on the amplitude of movement and the magnitude of acceleration of the actual building or structure caused by a seismic event, earthquake, or other external force. The magnitude and duration of this acceleration and the amplitude of the associated structural movement of a building or structure is the primary cause of damage to the building or structure and the associated potential for collapse of the building or structure.

Prior art earthquake detectors or sensors measure the amplitude of the earthquake itself, which may or may not be directly proportional to the movement in the building or structure resulting from the earthquake. With weaker construction types or building designs, the movement in the building or structure may be considerably greater than the movement of the earthquake itself. With stronger construction types or building designs, the movement in the building or structure may be considerably less than the movement of the earthquake itself. The most important factor in an earthquake alarm should be the building's response to the ground movement or earthquake, not the earthquake motion itself.

This invention is a solid-state device that detects the motion of a building or structure and initiates an alarm when the motion of a building or structure rises above a certain base level or threshold level of motion that is automatically calibrated or manually entered for the specific building or structure and the specific location of the building or structure.

BRIEF SUMMARY OF THE INVENTION

It is an aspect of earthquake detector to detect seismic events or earthquakes.

It is an aspect of earthquake detector to measure continuous oscillatory movements of a building or structure.

It is an aspect of earthquake detector to rest on a floor of a building, on a table or shelf in a building, affixed to a ceiling of a building, affixed to a wall of a building, plugged into an electrical outlet in a building, or otherwise positioned or affixed to a stationary surface in a building while measuring the continuous oscillatory movements of a building or structure.

It is an aspect of earthquake detector to signal an alarm when a seismic event or earthquake is detected.

It is an aspect of earthquake detector to include a circuit board, an accelerometer, an alarm, and a microprocessor loaded with special operating software.

It is an aspect of earthquake detector to continuously measure the motion of itself relative to a fixed point on the earth's surface.

It is an aspect of earthquake detector to detect and correct for electronic noise that shows up in the acceleration readings of the accelerometer.

It is an aspect of earthquake detector to mathematically convert the corrected acceleration readings of the accelerometer into displacement calculations of the accelerometer.

It is an aspect of earthquake detector to produce a continuous value stream of displacement calculations of the accelerometer based upon corrected acceleration readings of the accelerometer.

It is an aspect of earthquake detector to automatically and/or manually conduct a calibration process that determines the continuous level of background oscillation motion of the earthquake detector and sets a first degree threshold level for oscillations or motion slightly greater than the continuous level of background oscillation motion of the earthquake detector.

It is an aspect of earthquake detector to automatically and/or manually conduct a calibration process that determines the continuous level of background oscillation motion of the earthquake detector and sets a second degree threshold level for oscillations or motion greater than the continuous level of background oscillation motion of the earthquake detector.

It is an aspect of earthquake detector to initiate an audible alarm and/or a visual alarm instructing occupants to take cover within the building or structure when earthquake detector measures oscillatory movements of a building or structure greater than the first degree threshold level but less than the second degree threshold level.

It is an aspect of earthquake detector to initiate an audible alarm and/or a visual alarm instructing occupants to evacuate the building or structure when the earthquake detector measures oscillatory movements of a building or structure greater than the second degree threshold level.

DEFINITION LIST

Figure 1:
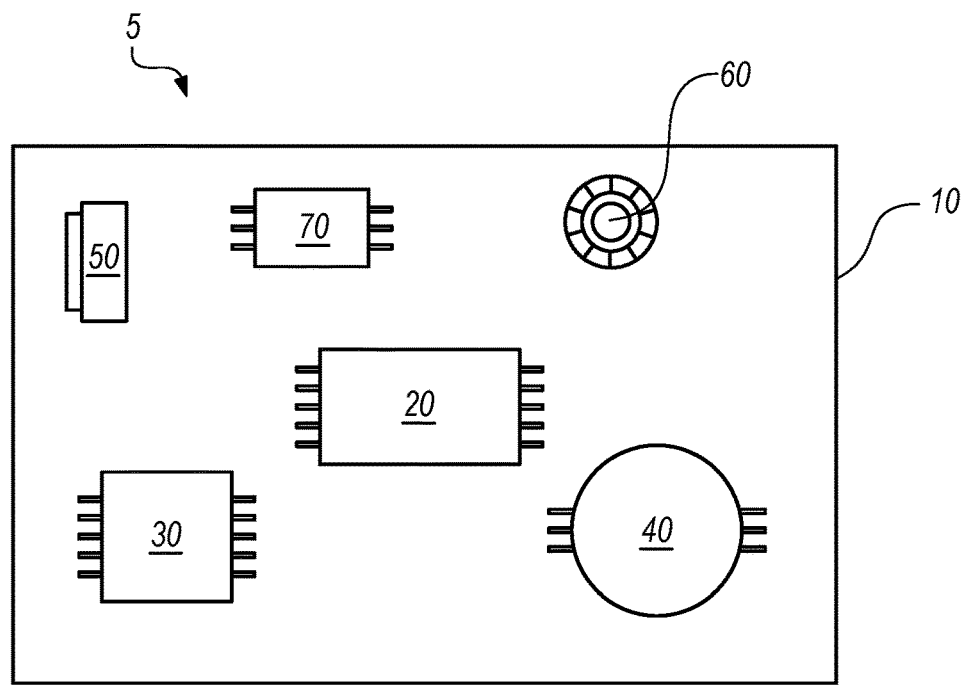
FIG. 1 is a top plan view of circuit board with: microprocessor, integrated circuit, or chip; accelerometer integrated circuit or chip; alarm module; connection to power source; and calibration control.

| Term | Definition |
| --- | --- |
| 5 | Earthquake Detector |
| 10 | Circuit Board |
| 20 | Microprocessor, Integrated Circuit, or Chip |
| 30 | Accelerometer Integrated Circuit or Chip |
| 40 | Alarm Module |
| 42 | Audible Alarm |
| 44 | Light Source or Visual Alarm |
| 50 | Connection to a Power Source |
| 52 | Terminal Block or Terminal Connector |
| 54 | Power Cord |
| 56 | Plug for Electrical Outlet |
| 58 | Battery |
| 60 | Calibration Control |
| 70 | Network Connection or Modem |
| 80 | Case or Housing |
| 100 | Narrow Ban of Background Oscillations |
| 105 | First Threshold Set Level |
| 110 | First Degree Oscillations Above Background Oscillations |
| 115 | Second Threshold Set Level |
| 120 | Second Degree Oscillations Above Background Oscillations |
| 130 | Electrical Wiring in the Building or Structure |

DETAILED DESCRIPTION OF THE INVENTION

Earthquake detector 5 is an electronic device or an electromechanical device. Earthquake detector 5 is a stand-alone unit with its own alarm or alert module. Earthquake detector 5 may have its own power source. Earthquake detector 5 may use, as its power source, an electrical connection to an electrical outlet or other electrical wiring in the building or structure. Earthquake detector 5 may have its own power source and a connection to an electrical outlet or other electrical wiring in the building or structure. Earthquake detector 5 continuously monitors movements of the building or structure, including extremely small movements of the building or structure, and signals one or more alerts or warnings when the movement rises above a particularly set calibration level. Movement means a distance of travel by the earthquake detector 5 in any direction, wherein the earthquake detector 5 is placed: on a floor of a building, on a table or shelf in a building, affixed to a ceiling of a building, affixed to a wall of a building, plugged into an electrical outlet in a building, or otherwise positioned or affixed to a stationary surface in a building.

Earthquake detector 5 comprises: a circuit board 10; a microprocessor, integrated circuit, or chip 20; an accelerometer integrated circuit or chip 30; an alarm module 40; a connection to a power source 50; and a calibration control 60.

Circuit board 10 is a printed circuit board that supports and electrically connects electronic or electrical components attached to the circuit board using conductive tracks, pads, solder, or other features etched or laminated onto the circuit board so that there is electrical continuity between these electronic or electrical components.

Microprocessor, integrated circuit, or chip 20 is an integrated circuit or monolithic integrated circuit, also referred to as an "IC", a chip, or a microchip that is a set of electronic circuits on one small flat piece of semiconductor material. Microprocessor, integrated circuit, or chip 20 has read only memory and random access memory. A special and custom operating software is loaded into the read only memory that may be updated through a wireless network connection or other network connection. Microprocessor, integrated circuit, or chip 20 is attached to or connected to circuit board 10 so that there is electrical continuity between these members.

Accelerometer integrated circuit or chip 30 is an accelerometer or a device that measures acceleration. Accelerometer integrated circuit or chip 30 produces output readings of the acceleration measured by the accelerometer integrated circuit or chip 30. Acceleration is the rate of change of velocity of a body in its own frame of reference. Accelerometer integrated circuit or chip 30 measures the magnitude of acceleration in one, two, or three dimensions. In best mode, accelerometer integrated circuit or chip 30 detects and measures acceleration in all three dimensions. There are several different types and brands of accelerometers in the prior art. Any known type or brand of accelerometer may be used with this invention. Accelerometer integrated circuit or chip 30 is attached to or connected to circuit board 10 so that there is electrical continuity between these members.

Earthquake detector 5 is a rigid and solid-state device that is essentially a rigid circuit board with electrical components rigidly attached thereto and without moving parts. The accelerometer integrated circuit or chip 30 is rigidly attached to the circuit board 10. The microprocessor, integrated circuit, or chip 20 is rigidly attached to the circuit board 10.

In use, earthquake detector 5 is placed on a floor of a building, on a table or shelf in a building, affixed to the ceiling of a building, affixed to a wall of a building, plugged into an electrical outlet of a building, or otherwise positioned stationary surface in a building. When the earth's crust moves or accelerates, this causes all buildings on the moving crust to also move or accelerate, which in turn causes an earthquake detector 5 within a moving building to also move or accelerate, which causes movement of the accelerometer integrated circuit or chip 30 because earthquake detector 5 is a rigid and solid state device. Thus, movement of the earth's crust will effectuate or cause movement of buildings, which effectuates or causes movement of earthquake detector 5, which effectuates or causes movement of accelerometer integrated circuit or chip 30 within earthquake detector 5. The accelerometer integrated circuit or chip 30 measures this movement.

Most accelerometers measure acceleration using a small ball located inside a piezoelectric box. The accelerometer measures the pressure of the small ball pressing against the inside of the piezoelectric box. This pressure generates an electric charge that is proportional to the amount of pressure applied to the piezoelectric box. When the accelerometer is at rest, the accelerometer still registers an amount of continuous downward acceleration from the earth's gravity as well as the amount of continuous upward centripetal acceleration from the earth's rotation. These accelerations are in opposition directions so the accelerometer reads and detects a net downward acceleration resulting from downward gravity minus upward centripetal acceleration. Depending on the orientation of the accelerometer, the net downward acceleration could register in one dimension or axis or in any combination of all three dimensions or axes.

Figure 2:
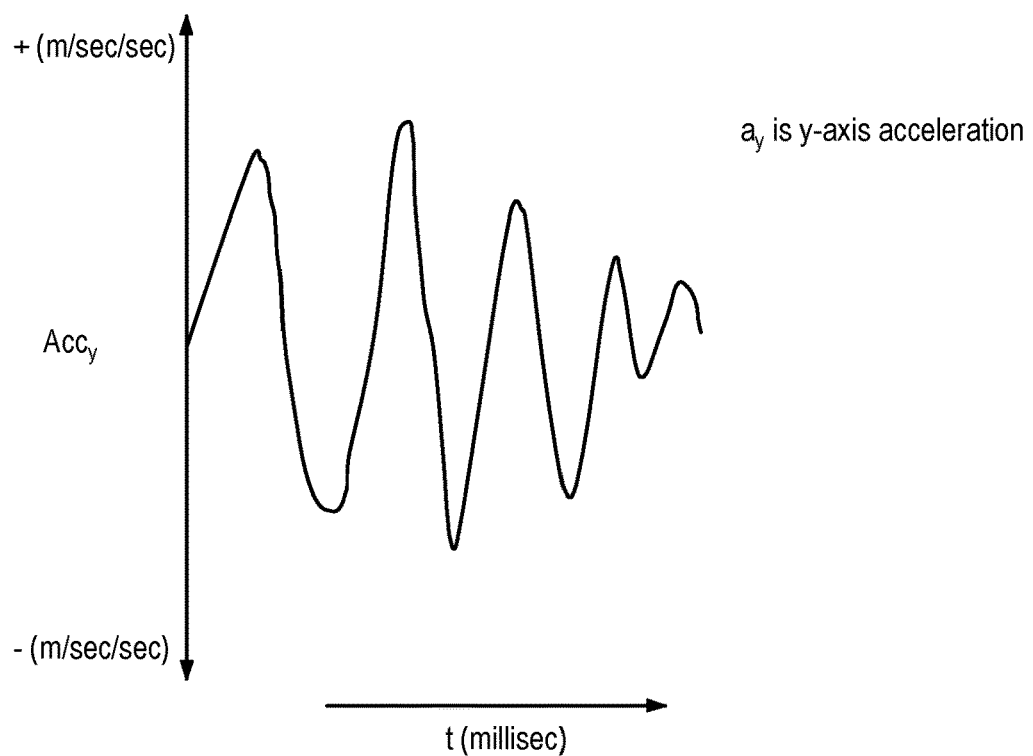
FIG. 2 is a graphical representation of the oscillatory acceleration of a building or structure in the y-dimension as detected by the earthquake detector.

This continuous net downward acceleration from gravity is not important or required with the detection process of an earthquake or any other unusual movement of the earth's crust. Therefore, the special and custom operating software loaded into the read only memory of the microprocessor, integrated circuit, or chip 20 has a subroutine to remove this continuous net downward acceleration from the analysis. There is a setup process, initiation process, or zeroing process that occurs when the earthquake detector 5 is first turned on or reset. The setup process automatically occurs when the earthquake detector 5 is powered on or may be run manually by an optional reset button (not depicted) on the earthquake detector 5. During this setup process or initiation process, the special and custom operating software loaded into the read only memory of the microprocessor, integrated circuit, or chip 20 analyzes acceleration readings from accelerometer integrated circuit or chip 30 for a brief period of time to determine the amount of continuous net downward acceleration due to gravity and centripetal force. The brief period of time is programed into the special and custom operating software loaded into the read only memory of the microprocessor, integrated circuit, or chip 20. The brief period of time can be anywhere from 1 second to 10 minutes or similar. The exact amount of continuous net downward acceleration depends on the specific location on the earth's surface and the specific altitude above the earth's surface. At any location, however, the net downward acceleration must be in the neighborhood of 9.8 meters per second squared, as this is a known and proven quantity in the scientific community. The special and custom operating software loaded into the read only memory of the microprocessor, integrated circuit, or chip 20 determines the exact amount of net downward acceleration, verifies this amount is the proper order of magnitude, and then subtracts this amount to effectively create a zero baseline that depicts zero acceleration and zero motion when the accelerometer is under the effect of gravity and centripetal forces only. FIG. 2 depicts movement of the accelerometer integrated circuit or chip 30 after the setup process, initiation process, or zeroing process has been completed. Depending on the orientation of the earthquake detector 5, the net downward acceleration may be subtracted from only one dimension or a component of the net downward acceleration may be subtracted from all three dimensions, where all components must add up to approximately 9.8 meters per second squared. In best mode, this is accomplished with a band pass filter or step function filter for each effected dimension where that band pass level or amplitude of the step function is custom set at a value slightly larger than the amount of continuous net downward acceleration in the respective dimension determined by the setup process. Thus, after the setup process is completed, only acceleration or movement not resulting from gravity or centripetal force is registered or counted as acceleration or movement.

The special and custom operating software loaded into the read only memory of the microprocessor, integrated circuit, or chip 20 continuously monitors the acceleration output readings from the accelerometer integrated circuit or chip 30. The special and custom operating software loaded into the read only memory of the microprocessor, integrated circuit, or chip 20 continuously converts acceleration output readings into movement or displacement of the accelerometer integrated circuit or chip 30 in one, two, or three dimensions. The special and custom operating software loaded into the read only memory of the microprocessor, integrated circuit, or chip 20 continuously converts the measured acceleration readings of the accelerometer integrated circuit or chip 30 into one or more value streams. The absolute position of the sensor in space is not required, but obtaining a reasonable approximation of the displacement that the sensor undergoes during an earthquake provides useful data for determining whether or not the structure has been subjected to potentially damaging movements. In best mode, the special and custom operating software loaded into the read only memory of the microprocessor, integrated circuit, or chip 20 continuously converts the measured acceleration readings of the accelerometer integrated circuit or chip 30 into three value streams that represent the amount of displacement of the accelerometer integrated circuit or chip 30 in all three dimensions. Each value stream represents the amount of displacement of the accelerometer integrated circuit or chip 30 in one the three dimensions of space.

Importantly, there is an inherent problem with acceleration readings from an accelerometer integrated circuit or chip 30 where these readings or data are very "noisy" and have substantial amounts of electronic noise. Electronic noise is an unwanted disturbance in an electrical signal. Electronic noise can be generated by electronic man-made devices or other natural sources. Electronic noise is an error or undesired random disturbance in a useful information signal. Electronic noise is a summation of unwanted or disturbing energy from all sources. The standard way to mathematically convert acceleration into movement or displacement is by integrating the acceleration data to yield velocity data. The integration of an acceleration curve will yield a velocity curve. Then a second integration of the velocity curve will yield a displacement curve. While this is mathematically correct, the noise that is inherent in the acceleration data is amplified by the integration steps and the displacement data calculated from the second integration of the velocity data ends up to be significantly different from reality. The noise in the acceleration data is amplified through the double integration to yield unreal data that is essentially useless. Without correcting for the noise initially, the displacement data will drift over time, resulting in increasing inaccuracy. For this reason, raw accelerometer data by itself is typically not useful. Raw accelerometer data is not used to determine position in commercial applications such as phones, gaming consoles, etc.

The Time Derivative of Acceleration (TDOA) is a way of measuring the rate of change of the acceleration in the same way the time derivative of velocity is a way of measuring the rate of change of velocity. This parameter is sometimes referred to as "jerk" and expresses how quickly acceleration is changing. This parameter is important in this case because the accelerations induced by earthquakes are neither smooth nor constant. Rather they tend to change rapidly in both direction and magnitude. This characteristic tends to exacerbate the challenges with noise and drift in the accelerometer. While not commonly used, TDOA has been studied with regards to the effects of the rate of change of acceleration on human perception of the environment, in situations like elevators, roller coaster rides, etc. There is also limited research on the effects of TDOA on structures during earthquakes. What research has been done suggests that more rapid rates of change of acceleration can cause more structural damage and are also perceived as "worse" or "more violent" shaking by human occupants. Note that TDOA mathematical calculations are typically done or completed using summations because that is the method most commonly used by computers to perform integrations.

There are at least three possible ways to correct for the noise and associated sensor drift in the accelerometer data, as follows:

First, an additional reference can be provided that can be fused with the accelerometer data to provide a more accurate picture. For example, a GPS sensor could be coupled with the accelerometer, or an external fixed reference point could be provided. In this application, neither of those options is considered feasible because GPS signals are inherently unreliable inside structures, and because there is no practical way to provide a fixed external reference that would not be subject to the same earthquake motions as the accelerometer.

The second option is to use a Kalman Filter approach to minimize the noise and improve the estimation of displacement. Existing research has shown that the use of a Kalman Filter approach with an off the shelf accelerometer can reduce the displacement data error from over 60% to less than 10%, which is well within the necessary accuracy for the application. There are two disadvantages to the Kalman Filter approach however. First, it is computationally complex and requires more processing power and memory to function. Second, the high TDOA of earthquake accelerations means that the Kalman Filter approach of predicting what the displacement becomes a less efficient algorithm.

The third option is to smooth the changes in acceleration by comparing the acceleration at time T to previous accelerations. By using the rate of change in acceleration at the previous interval (time=t−1), a new predicted acceleration at the current interval (time=t) can be calculated. This method is called Predicted Derivative of Acceleration (PDOA). If the measured acceleration is significantly different than the predicted acceleration, the predicted acceleration can then be substituted for the measured acceleration. At the same time an updated PDOA for the current interval (time=t) can be calculated to be used in subsequent calculations, and the cycle repeats. This approach has the effect of smoothing the changes in measured acceleration and consequently smoothing the computed velocities and displacements. This approach is computationally simple and does not require significant processing power. Thus, this is the method used by this invention.

The timing of the reading of the accelerometer is sufficiently rapid to allow for the device to respond to the changes in acceleration that a typical earthquake demonstrates. Research indicates that the majority of TDOA is within a frequency band of 0-30 Hz, so a sampling rate in the range of 2-50 milliseconds is sufficiently detailed to allow for predicting the changes in acceleration. This means that an acceleration reading is taken every 2-50 milliseconds or the sample rate is 2-50 milliseconds. Mathematically this means that the time between t and t+1 is about 2-50 milliseconds. Therefore, the sample rate or $\Delta t$=2-50 milliseconds in the equations below. In best mode, the sample rate of $\Delta t$ is about 5-10 milliseconds. The following mathematical process is performed by the special and custom operating software loaded into the read only memory of the microprocessor, integrated circuit, or chip 20 for each sample taken or acceleration reading from the accelerometer integrated circuit or chip 30. The process is an iterative process that consists of loops inside of loops or nested loops. For each reading of acceleration in each dimension, the special and custom operating software loaded into the read only memory of the microprocessor, integrated circuit, or chip 20 performs loop calculations to correct the acceleration reading for sensor drift and to determine velocity and displacement from the corrected acceleration reading that is used to determine if there is an alarm condition. Again, all of these loop calculations are performed for each reading of acceleration in each dimension.

The TDOA is calculated inside of a loop prior to each acceleration reading from the accelerometer integrated circuit or chip 30. Acceleration is measured at time=t−2 and at subsequent interval time=t−1. The TDOA of these readings is then used to predict the next acceleration value at time=t, which is the basis of comparison for the subsequent reading. Note that if an estimated value is used for a previous acceleration reading then the system will not use an estimated value for the next acceleration reading. If an estimated value is used for time=t+1, then the system will not use an estimated value for time=t+2 regardless of the deviation to prevent the system from accumulating errors from the estimated values. Also, note that calculations regarding magnitude of a parameter are done by absolute value using a high-pass filter routine whereas other calculations require attention to the vector sign.

Prior to each acceleration reading, perform the following:

Ax or $a_x$ is acceleration in the x dimension. Ay or $a_y$ is acceleration in the y dimension. Az or $a_z$ is acceleration in the z dimension.

Read Ax, Ay, Az from accelerometer integrated circuit or chip 30 for time=t−2

Set acceleration readings in storage array at time=t−2 at Ax, Ay, Az

Read Ax, Ay, Az from accelerometer integrated circuit or chip 30 for time=t−1

Set acceleration readings in storage array at time=t−1 at Ax, Ay, Az

Calculate the TDOA for time=(t−2) to (t−1) for all three axes with this equation $$a'_y \approx \frac{\Delta a}{\Delta t} \approx \frac{(a_{yt-1} - a_{yt-2})}{\Delta t},$$

which is calculated in all three dimensions x, y, and z, where a' signifies the derivative of acceleration. In the y dimension, this equation can be written as $A'_y(t-1)=(Ay(t-1)-Ay(t-2)/((t-1)-(t-2))$. In the x dimension, this equation can be written as $A'_x(t-1)=(Ax(t-1)-Ax(t-2)/((t-1)-(t-2))$. In the z dimension, this equation can be written as $A'_z(t-1)=(Az(t-1)-Az(t-2)/((t-1)-(t-2))$.

Note that this equation is not exact unless the function is linear, which the acceleration measured by the accelerometer clearly is not. However, when the difference between samples is sufficiently small, the line between the two samples approaches a linear function with a constant slope, thereby allowing this equation to be nearly exact and accurate enough.

Store the calculated $a'_x$, $a'_y$, and $a'_z$ for time=t−1.

Estimate the acceleration value for $a_x$, $a_y$, and $a_z$ at time=t with this equation $a_{y(t\ est)}=a_{y(t-1)}+a'_y\Delta t$, which is calculated in all three dimensions x, y, and z. In the y dimension, this equation can be written as $A_y(t)$ estimated=$A_y(t-1)+A'_y(t-1)*(\Delta t)$. In the x dimension, this equation can be written as $A_x(t)$ estimated=$A_x(t-1)+A'_x(t-1)*(\Delta t)$. In the z dimension, this equation can be written as $A_z(t)$ estimated=$A_z(t-1)+A'_z(t-1)*(\Delta t)$.

Store the calculated $a_x(t)$ estimated, $a_y(t)$ estimated, and $a_z(t)$ estimated for time=t.

Then take an acceleration reading and perform the following:

Read acceleration from accelerometer integrated circuit or chip 30 at time=t in all three dimensions x, y, and z.

Set acceleration readings in storage array at time=t at Ax, Ay, Az

Compare Ax, Ay, Az (t) to $a_x(t)$ estimated, $a_y(t)$ estimated, $a_z(t)$ estimated respectively If the absolute value of Ax, Ay, Az (t)>105 to 200 percent of absolute value of $a_x(t)$ estimated, $a_y(t)$ estimated, $a_z(t)$ estimated respectively and the actual measured value of acceleration was used in the previous loop, Then set Ax, Ay, Az equal to $a_x(t)$ estimated, $a_y(t)$ estimated, $a_z(t)$ estimated respectively in storage array at time=t and set a variable called Estimate Used=Yes Else set value in storage array equal to Ax, Ay, Az at time=t and set a variable called Estimate Used=No After each acceleration reading, perform the following:

Calculate the velocity of accelerometer integrated circuit or chip 30 based on the previous acceleration data (either estimated or measured as determined in the previous step). Calculate the velocity in each axis at time=t as the running sum of the average of acceleration at time=t and time=t−1, multiplied by the interval time between t and t−1. Thus, velocity at any given time=t, is calculated as a "running sum" of the estimated velocities, taking care to observe the sign (direction) of the acceleration vector, using the following equation.

$$v_{yt} = \sum_{t=0}^{t=t} \frac{(a_{yt-1} + a_{yt})}{2} * (t_t - t_{t-1})$$

Since this is only a two term summation, this equation may be written as follows.

In the x dimension, this equation can be written as $V_x(t-1)=(A_x(t-2)+A_x(t-1))/2)*(\Delta t)$ and $V_x(t)=(A_x(t-1)+A_x(t))/2)*(\Delta t)$.

In the y dimension, this equation can be written as $V_y(t-1)=(A_y(t-2)+A_y(t-1))/2)*(\Delta t)$ and $V_y(t)=(A_y(t-1)+A_y(t))/2)*(\Delta t)$.

In the z dimension, this equation can be written as $V_z(t-1)=(A_z(t-2)+A_z(t-1))/2)*(\Delta t)$ and $V_z(t)=(A_z(t-1)+A_z(t))/2)*(\Delta t)$.

Calculate the displacement of accelerometer integrated circuit or chip 30 based on the previous velocity data (either estimated or measured as determined in the previous step). Calculate the displacement in each axis at time=t as the running sum of the average of velocity at time=t and time=t−1, multiplied by the interval time between t and t−1. Thus, displacement at any given time=t, is calculated as a "running sum" of the estimated velocities, taking care to observe the sign (direction) of the velocity vector, using the following equation.

$$d_{yt} = \sum_{t=0}^{t=t} \frac{(v_{yt-1} + v_{yt})}{2} * (t_t - t_{t-1})$$

Since this is only a two term summation, this equation may be written as follows.

In the x dimension, this equation can be written as $D_x(t)=(V_x(t-1)+V_x(t))/2)*(\Delta t)$].

In the y dimension, this equation can be written as $D_y(t)=(V_y(t-1)+V_y(t))/2)*(\Delta t)$].

In the z dimension, this equation can be written as $D_z(t)=(V_z(t-1)+V_z(t))/2)*(\Delta t)$].

Vx or $v_x$ is velocity in the x dimension. Vy or $v_y$ is velocity in the y dimension. Vz or $v_z$ is velocity in the z dimension.

Dx or $d_x$ is displacement in the x dimension. Dy or $d_y$ is displacement in the y dimension. Dz or $d_z$ is displacement in the z dimension.

At each time interval, after calculating and storing the acceleration, velocity, and displacement, the special and custom operating software loaded into the read only memory of the microprocessor, integrated circuit, or chip 20 evaluates acceleration, velocity, and displacement against an alarm condition.

If Estimate Used=Yes, then the special and custom operating software obtains new acceleration readings for Ax, Ay, Az from said accelerometer integrated circuit or chip at time=t+1, the next time internal, and starts the iterative process all over again from the top.

If Estimate Used=No, then evaluate whether Ax, Ay, or Az is greater than a first threshold level of acceleration and/or evaluate whether Vx, Vy, or Vz is greater than a first threshold level of velocity and/or Dx, Dy, or Dz is greater than a first threshold level of displacement.

If yes, then an alarm subroutine runs to further evaluate the circumstances that generated the alarm.

If no, then run a zeroize routine that evaluates the current Dx, Dy, and Dz to determine "reasonableness" based on the historical velocity values. If Dx, Dy, and Dz is determined to have begun to accumulate errors, the special and custom operating software loaded into the read only memory of the microprocessor, integrated circuit, or chip 20 resets the value of displacement to 0 (zero).

Then special and custom operating software loaded into the read only memory of the microprocessor, integrated circuit, or chip 20 starts all over again at the top of the first loop to take acceleration readings at t+1. In the next iteration, t+1 becomes t, t becomes t−1, and t−1 becomes t−2, and the equations are run all over again with the next data set.

Figure 3:
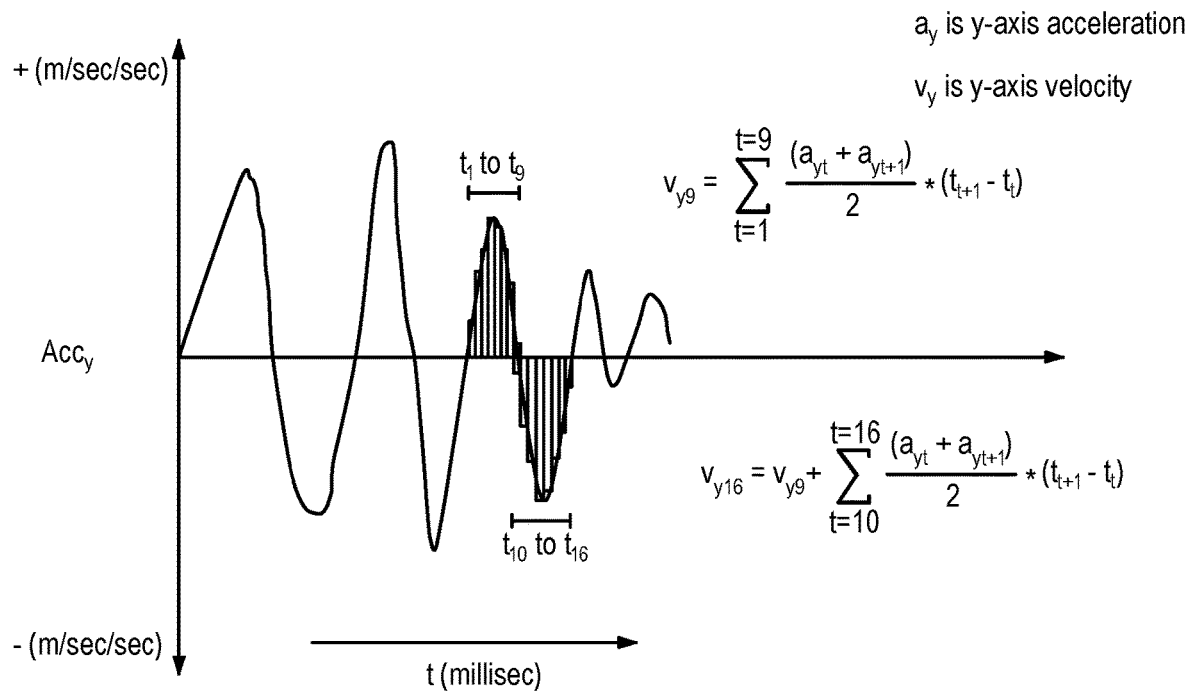
FIG. 3 is a graphical representation of the oscillatory acceleration of a building or structure in the y-dimension with mathematical equations to convert acceleration into velocity from t=1 to 9 and t=10 to 16.
Figure 4:
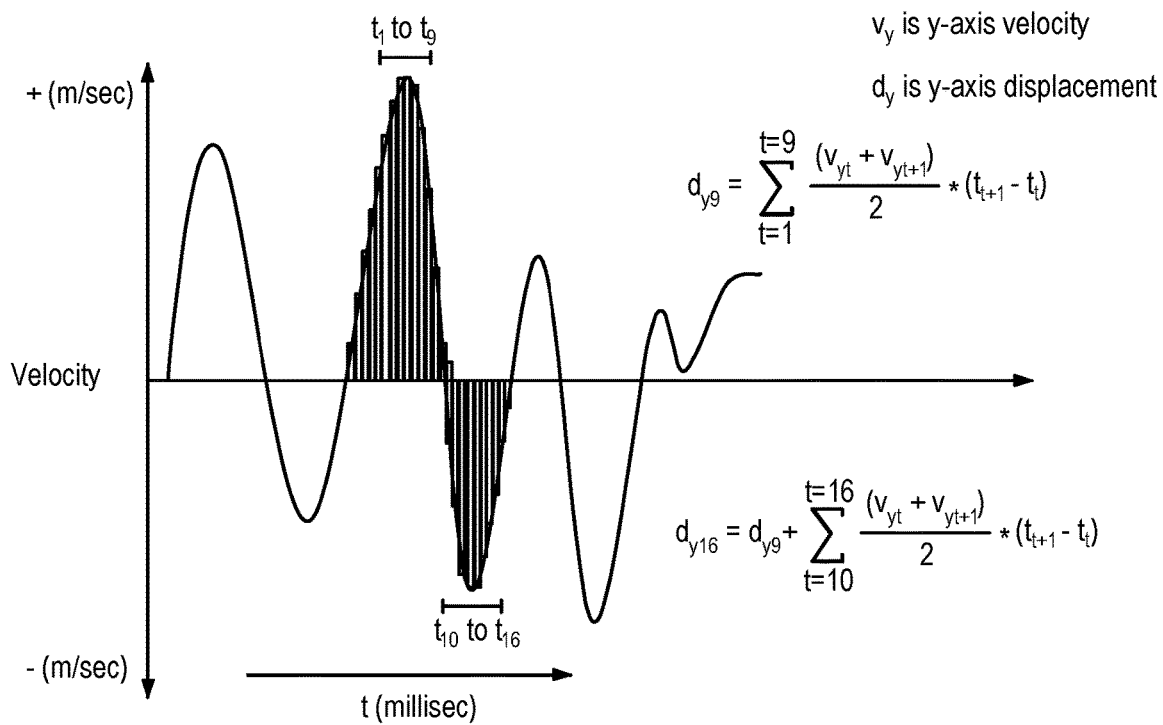
FIG. 4 is a graphical representation of the oscillatory velocity of a building or structure in the y-dimension with mathematical equations to convert velocity into displacement from t=1 to 9 and t=10 to 16.
Figure 5:
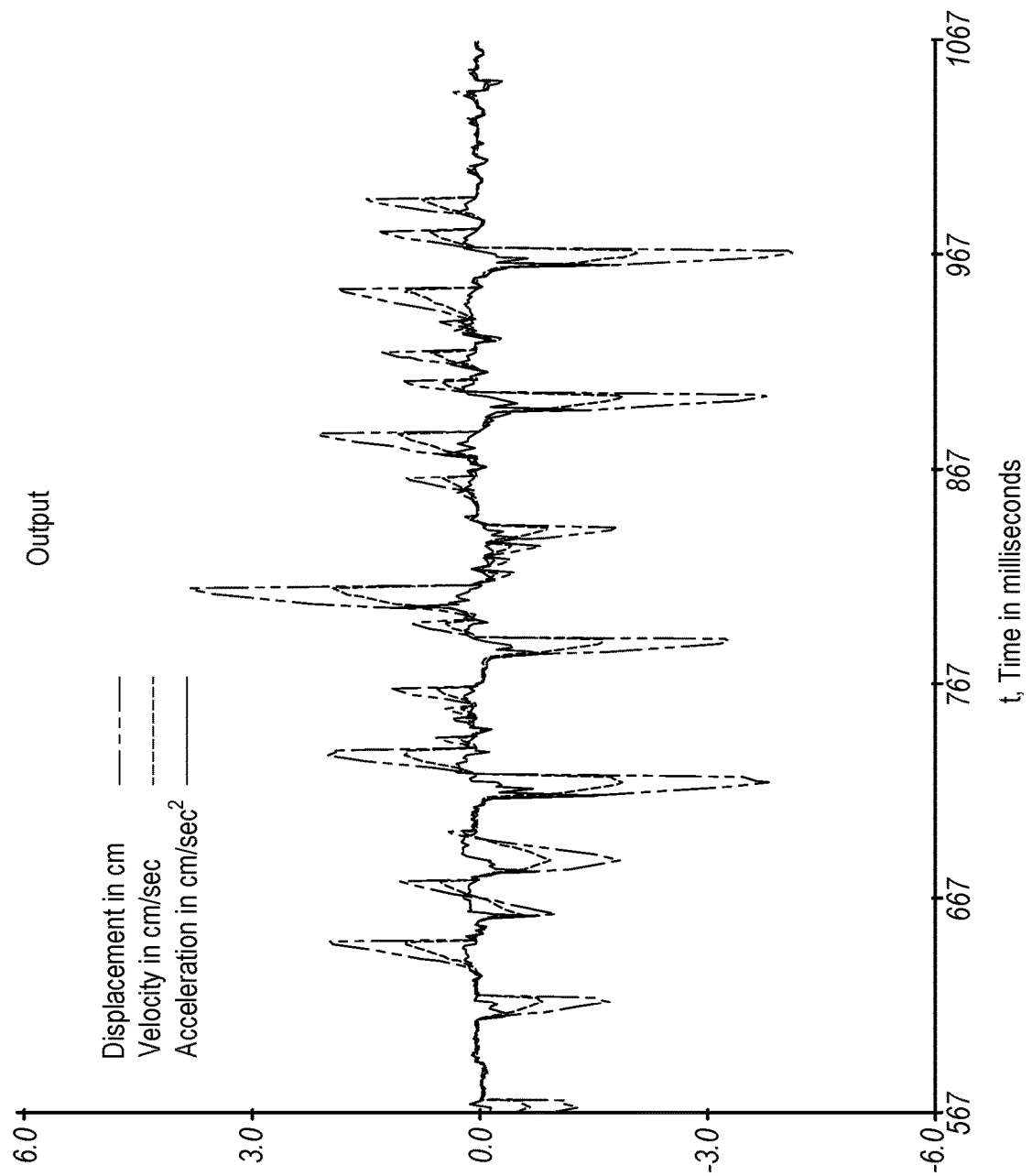
FIG. 5 is a graphical representation of the displacement, velocity, and acceleration of a building or structure in the one dimension.

As stated, $X_2-X_1$ is the displacement of the accelerometer integrated circuit or chip 30 that has $A_1$ acceleration at time $T_1$ and $A_2$ acceleration at time $T_2$. The time between $T_1$ and $T_2$ can be adjusted or tuned as necessary to yield the best results. The displacement value stream in one dimension is depicted in FIG. 2. Thus, the special and custom operating software loaded into the read only memory of the microprocessor, integrated circuit, or chip 20 continuously performs calculations depicted in FIGS. 3 and 4 to yield a value stream depicted in FIG. 5, which is the displacement of accelerometer integrated circuit or chip 30. The read only memory of the microprocessor, integrated circuit, or chip 20 continuously performs the above calculations at intervals t to t=1 to correct for electronic noise and continuously produce a value stream of displacement data in one, two, or three dimensions. Please note that the 105 to 200 percent value listed in the calculations above is a tunable value that should be tuned or adjusted to yield the best results. In best mode, this value is about 125 percent.

This value stream graphically depicts a wave shape or wave shaped reading of positive and negative values oscillating around a zero reading. The zero reading means no movement or acceleration relative to a stationary point on the earth's surface. Note that when earthquake detector 5 is positioned on a floor of a building, table, or shelf, affixed to a ceiling, affixed to a wall, plugged into an electrical outlet, or otherwise positioned or affixed to a stationary surface in a building, earthquake detector 5 still moves in a continuous oscillatory movement or in a cyclical motion around a rest position that is stationary. The structure of every building or structure on the earth continuously vibrates to a certain degree. This continuous oscillatory movement could be in one dimension or any combination of all three dimensions, including up and down, left and right, north and south, east and west, etc.

Even when there is no earthquake or any other unusual movement of the earth's crust, the earth's crust still vibrates or moves in a small degree. Even when there is no earthquake or any other unusual movement of the earth's crust, all buildings or structures still move or oscillate from wind load or windy weather outside. The continuous oscillatory movement could result from continuous vibrations in the earth's crust, wind load, or any combination thereof. Thus, even when there is no earthquake or any unusual movement of the earth's crust, accelerometer integrated circuit or chip 20 still detects and measures acceleration and movement. For the purposes of this invention, this continuous oscillatory acceleration and movement is defined as background oscillations. Background oscillations are depicted as a narrow band of background oscillations 100 in FIG. 2.

Alarm module 40 functions to sound an alarm and/or flash an alarm. Alarm module 40 may be the source of an audible alarm 42 that emits sound waves that are capable of being heard by people in the vicinity of earthquake detector 5. Alarm module 40 may be a light source or visual alarm 44 that illuminates continuously, flashes, or strobes to emit light that is capable of being seen by people in the vicinity of earthquake detector 5. Alarm module 40 may include both an audible alarm 42 and a visual alarm 44. Alarm module 40 may be an integrated circuit or chip. Alarm module 40 may have a separate audible component or noise making component that may be: a horn, a siren, a speaker, a beeper, a beeping integrated circuit or chip, or any other noise making electronic component. Alarm module 40 may have a separate sight component or light making component that may be: a light source, light bulb, light emitting diode, flash bulb, strobe light, or any other light emitting electronic component. Alarm module 40 may have two or more alarm messages or alarm types. The first type may instruct occupants to immediately take cover within the building or structure. The second type may instruct occupants to immediately evacuate or exit the building or structure. Alarm module 40 is attached to or connected to circuit board 10 so that there is electrical continuity between these members.

The noise corrected acceleration values, noise corrected velocity values, and/or noise corrected displacement values calculated from the above detailed process, are then continuously run through an alarm subroutine or module in order to determine if an alarm condition exists. At each time interval, after calculating and storing displacement, velocity and acceleration, the special and custom operating software loaded into the read only memory of the microprocessor, integrated circuit, or chip 20 evaluates this data for an alarm condition. The special and custom operating software loaded into the read only memory of the microprocessor, integrated circuit, or chip 20 first uses the Estimate Used control variable to decide whether to evaluate the data at a certain time interval. If the Estimate Used control variable is set to NO, the special and custom operating software looks at the data set to determine if it is greater in any axis than the allowable acceleration for the conditions. This is essentially a "high-pass filter. If the current data passes the initial alarm threshold, then an alarm subroutine runs to further evaluate the circumstances that generated the alarm. If not, then the special and custom operating software runs a zeroize subroutine that evaluates the current data to determine "reasonableness" based on the historical velocity values. If the displacement is determined to have begun to accumulate errors, the special and custom operating software resets the value of the data to 0 (zero). The special and custom operating software loaded into the read only memory of the microprocessor, integrated circuit, or chip 20 then starts the main loop over at the top to read the next time interval acceleration. An alarm is triggered as appropriate based on triggered alarm conditions as discussed below.

The alarm routine relies upon multiple criteria to generate a graduated response from the earthquake detector 5, meaning that the earthquake detector 5 can make recommendations to occupants over the course of the event similar to the following. The earthquake detector 5 detects accelerations consistent with a moderate earthquake and notifies the occupants that an earthquake has been detected and advises them to "Drop, Cover, and Hold On" consistent with FEMA guidelines. The earthquake detector 5 detects driven building accelerations at a rate high enough and long enough to cause concern over the long-term structural integrity of the building. As accelerations taper off and earthquake detector 5 determines that the main shock has passed, the alarm then advises the occupants that they should consider evacuating the building consistent with the next steps outlined in the FEMA guidance. If the alarm condition is set by the acceleration condition above, then the next step is to evaluate the magnitude of the acceleration and determine what level of alarm needs to be set. When the alarm condition is set, the special and custom operating software branches to a separate loop/subroutine that continues to read accelerations and calculate the velocities and displacements appropriately. This routine also continuously evaluates the alarm condition and determines whether the shaking has stopped for a sufficiently long time period to indicate that the shock has likely passed. When that has occurred, the special and custom operating software reviews the data array back to the time stamp of the initial alarm and reviews the following criteria:

Maximum (absolute value) magnitude of acceleration in all three axes

Duration of max acceleration

Maximum (absolute value) magnitude of TDOA in all three axes

Maximum (absolute value) magnitude of displacement in all three axes

The software then evaluates the above criteria against a set of values (that are customizable) to determine whether the recommendation should be made for the occupants to leave the structure based on the likelihood that the structure has been compromised.

Connection to power source 50 is an electrical connection to a power source wherein the power source is a source of electrical power. Connection to power source 50 is an electrical connector. Electrical power is an electromotive force caused by a difference in potential that gives rise to an electric current. Power source may be: a battery, an inverter, a generator, connection to an electrical outlet in the building, connection to electrical wiring in the building, or other electrical power source. Electrical power may be alternating current or direct current. Connection to power source 50 is attached to or connected to circuit board 10 so that there is electrical continuity between these members.

Figure 7:
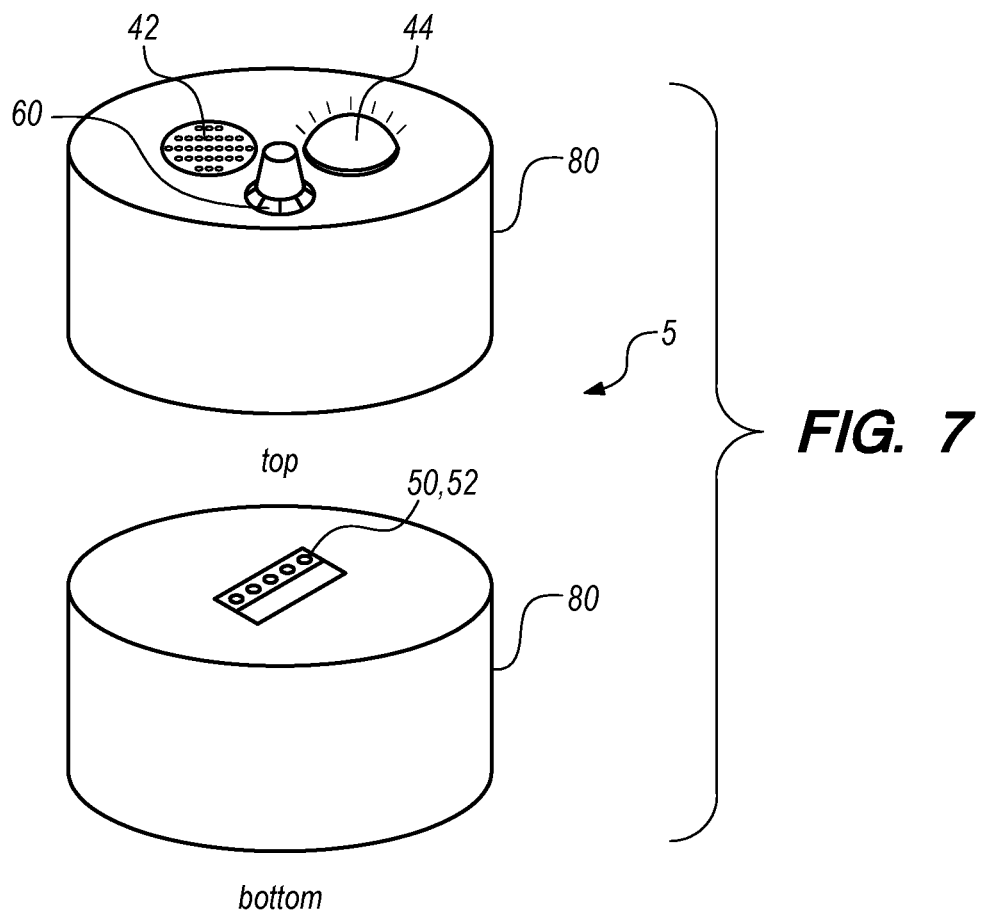
FIG. 7 is a top perspective view and a bottom perspective view of an embodiment of earthquake detector with a terminal block or terminal connector used for the connection to a power source.

In a first embodiment, connection to power source 50 is a terminal block or terminal connector 52. Terminal block or terminal connector 52 functions to electrically connect circuit board 10 to a power source so that there is electrical continuity between these members. The power source is electrical wiring from the building or structure wherein the electrical wires are attached to terminal block or terminal connector 52 so that there is electrical continuity between these members. Terminal block or terminal connector 52 is typically affixed to circuit board 10 so that there is electrical continuity between these members. Terminal block or terminal connector 52 may be located within case or housing 80 or located on the exterior of the case or housing 80 of earthquake detector 5. An embodiment with terminal block or terminal connector 52 located on the exterior of the case or housing 80 is depicted in FIG. 7. Alternately, connection to power source 50 may be a plurality of electrical wires or a 'pigtail' of electrical wires extending out from the case or housing 80 of earthquake detector 5, to which electrical wiring from the building or structure is connected thereto so that there is electrical continuity between these members. In this embodiment, earthquake detector 5 would be attached or affixed to a wall or ceiling of the building or structure. This embodiment is similar to a smoke detector device in that it is attached to a wall or ceiling or a building and connected to electrical wiring in the building. Electrical wiring from the building or structure is not depicted.

Figure 8:
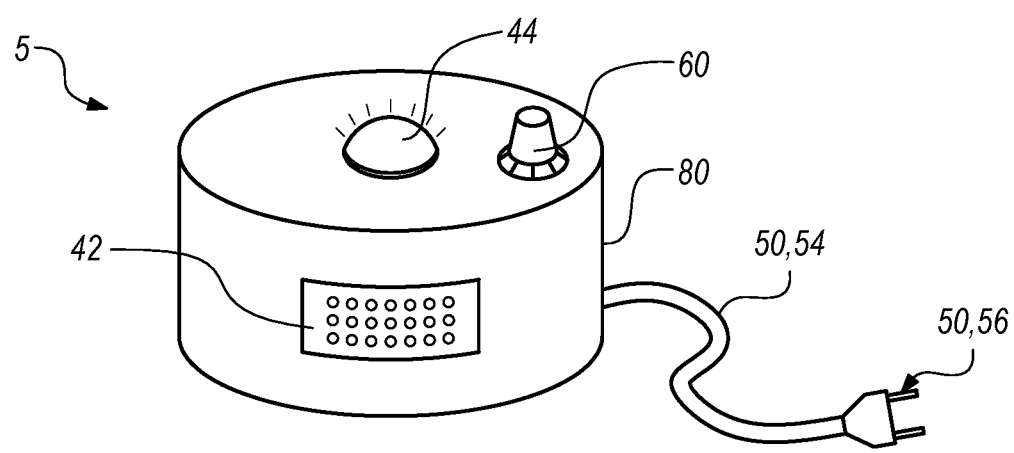
FIG. 8 is top perspective view of an embodiment of earthquake detector with a power cord used for the connection to a power source.

In another embodiment, connection to power source 50 is a power cord 54 and a plug for an electrical outlet 56. In this embodiment, the plug for an electrical outlet 56 is simply plugged into or connected to an electrical outlet or receptacle in the building or structure so that there is electrical continuity between these members. An electrical outlet or receptacle in the building or structure is a power source connected to the electrical wiring of a building or structure. This embodiment is depicted in FIG. 8. Electrical outlet or receptacle in the building or structure is not depicted.

Figure 9:
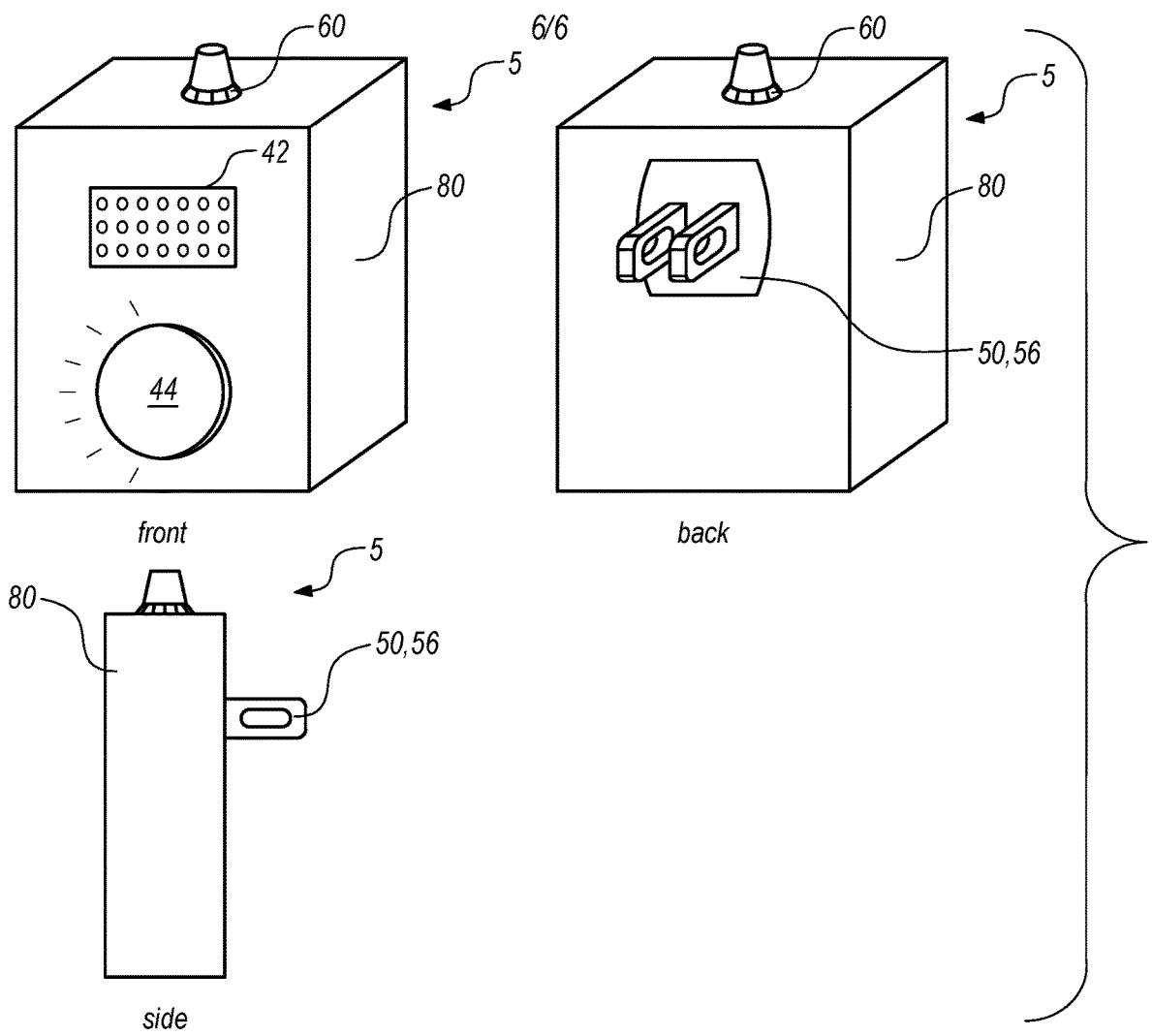
FIG. 9 is a front perspective view, a rear perspective view, and a side elevation view of an embodiment of earthquake detector with a retractable plug for an electrical outlet used for the connection to a power source.

In another embodiment, connection to power source 50 is just a plug for an electrical outlet 56 that protrudes out from the rear surface of the case or housing 80 or earthquake detector 5. Plug for an electrical outlet 56 may be retractable. In this embodiment, the plug for an electrical outlet 56 is plugged into or inserted into an electrical outlet or receptacle in the building or structure so that there is electrical continuity between these members. In this embodiment, the plug for an electrical outlet 56 serves two purposes. It obviously connects earthquake detector 5 to a power source but it also serves as a mount or a means of attachment to the wall of the building or structure or a means to affix earthquake detector 5 to the wall of the building or structure. This embodiment is depicted in FIG. 9. Electrical outlet or receptacle in the building or structure is not depicted.

Figure 10:
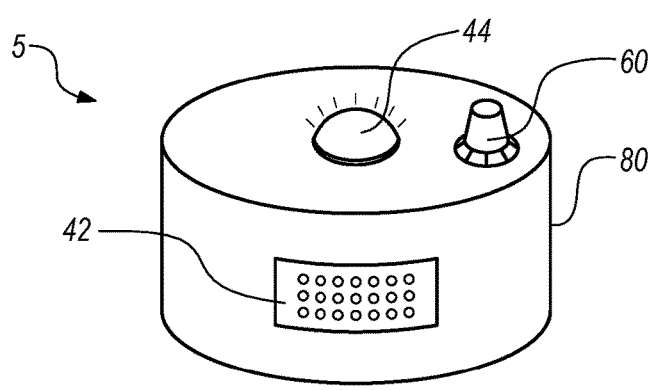
FIG. 10 is a top perspective view of an embodiment of earthquake detector with a battery used for the connection to a power source.

In another embodiment, earthquake detector further comprises a battery 58. Battery 58 is an electric battery that is a device consisting of one or more electrochemical cells with external electrical connections that functions to power electrical devices. Battery 58 is attached to or connected to circuit board 10 so that there is electrical continuity between these members. In this embodiment, connection to power source 50 has electrical continuity with battery 58. In this embodiment, battery 58 is the power source to provide electric power to the microprocessor, integrated circuit, or chip 20, accelerometer integrated circuit or chip 30, and alarm module 40. In this embodiment, earthquake detector 5 is a stand-alone unit that can fully function without any connections to anything else. This embodiment is depicted in FIG. 10.

Calibration control 60 is one or more buttons, switches, knobs, or electronic controls attached to or connected to circuit board 10 so that there is electrical continuity between these members. Calibration control 60 may be one or more of any known type of electronic or electrical buttons, switches, knobs, controls, or similar. The calibration control 60 functions to help calibrate earthquake detector 5 as discussed below.

In order to properly operate earthquake detector 5, the microprocessor, integrated circuit, or chip 20 must be calibrated or programmed to recognize the certain and particular level of background oscillations of the particular building at the particular location on the earth's surface, in the particular building or structure, where the particular earthquake detector 5 is located. The calibration process is an important requirement for the proper functioning of earthquake detector 5 because each structure behaves differently under the particular wind loads and the particular environmental forces of the specific location of the building or structure. For instance, a tall high-rise building in a windy environment typically sways far greater than a ranch house shielded from the wind. The building's motion from standard wind loads must be discounted to provide for adequate detection of seismic motion or else earthquake detector 5 would trigger false positive alarms. The type of structure, masonry, reinforced concrete, wood frame, steel, etc. will have an effect on the structure's response to wind and seismic waves in the earth's mantle. Being able to easily calibrate or adjust the device's alarm response provides for enhanced flexibility in application and allows for maximum utility in a broad range of applications without manufacturing changes.

Calibration may be conducted automatically where the special and custom operating software loaded into the read only memory of the microprocessor, integrated circuit, or chip 20 is programed to perform a calibration function that determines the average amplitude or magnitude of the measured movement in one, two, or three dimensions of the background oscillations and prevent the alarm module 40 from initiating with readings at or below this level.

Figure 6:
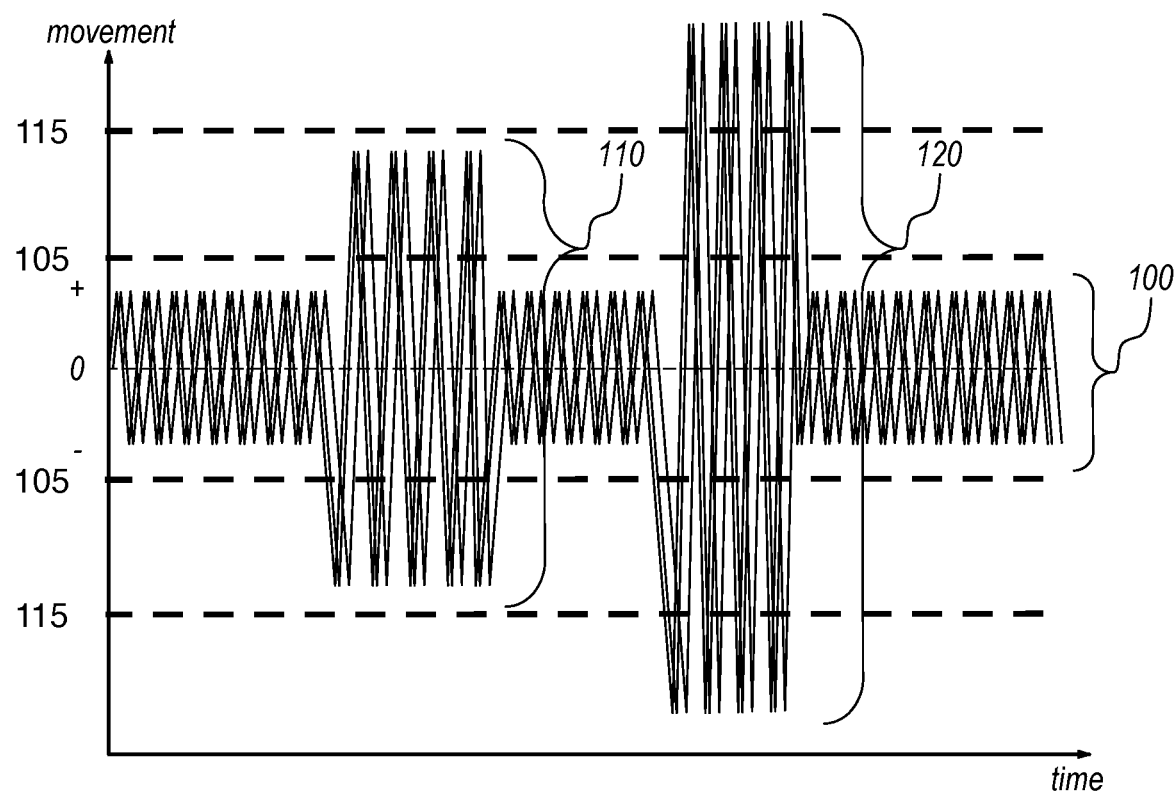
FIG. 6 is a graphical representation of the oscillatory acceleration of a building or structure in one dimension as detected by the earthquake detector.

After the automatic calibration process is initiated, the special and custom operating software loaded into the read only memory of the microprocessor, integrated circuit, or chip 20 analyzes displacement of the earthquake detector 5 in one, two, or three dimensions for a brief period of time to determine the range of amplitude or magnitude of the background oscillations of the particular circumstances of the exact location of the earthquake detector 5. The brief period of time is programed into the special and custom operating software loaded into the read only memory of the microprocessor, integrated circuit, or chip 20. The brief period of time can be anywhere from 1 second to 10 minutes or similar. The amplitude or magnitude of the background oscillations depends on the specific location on the earth's surface and the specific type of building or structure in which earthquake detector 5 is located. The special and custom operating software loaded into the read only memory of the microprocessor, integrated circuit, or chip 20 determines the amplitude or magnitude of the narrow band of background oscillations 100 and then sets a first threshold set level 105 that is slightly larger than the amplitude or magnitude of the narrow band of background oscillations 100 as depicted in FIG. 6. The special and custom operating software loaded into the read only memory of the microprocessor, integrated circuit, or chip 20 may also set a second threshold set level 115 at a level that is 3-30 percent above the first threshold set level 105. The exact percentage above the first threshold set level 105 is determined by the building type and construction type of the building or structure in which the earthquake detector 5 is located which would have to be manually entered into the earthquake detector 5. Alternately, the second threshold set level 115 could be manually set at one of many a predetermined levels that are stored within the special and custom operating software according to the building type and construction type of the building or structure in which the earthquake detector 5 is located. The second threshold set level 115 is the level of continuous oscillatory movements of a building or structure at which the building or structure is at high risk of failure and/or collapse. If continuous oscillatory movements of a building or structure are above this level, the occupants would never be safe within the building or structure and therefore the occupants should seek immediate evacuation of exit from the building or structure.

After the calibration process is completed, all displacement or movement detected by earthquake detector 5 at amplitudes or magnitudes less than the first threshold set level 105 does not set off alarm module 40 while all displacement or movement detected by earthquake detector 5 at amplitudes or magnitudes greater than the first threshold set level 105 but less than the second threshold set level 115 would set off alarm module 40 instructing occupants to immediately take cover within the building or structure. Also, all displacement or movement detected by earthquake detector 5 at amplitudes or magnitudes greater than the second threshold set level 115 would set off alarm module 40 instructing occupants to immediately evacuate and exit the building or structure. In best mode, first and second threshold set levels 105,115 are each accomplished with a band pass filter or step function filter for each dimension measured where that band pass level or amplitude of the step function is set at the threshold set levels 105, 115 to control the alarm module 40.

After the calibration process is completed, the alarm module 40 will not initiate for oscillatory movement with amplitude or magnitude less than or equal to the first threshold set level 105. On the other hand, if any oscillatory movement with amplitude or magnitude of the measured movement is greater than the first threshold set level 105, the earthquake detector 5 will initiate the alarm module 40 by sounding alarms and/or flashing lights. The special and custom operating software loaded into the read only memory of the microprocessor, integrated circuit, or chip 20 continuously monitors the continuous oscillatory movement of the earthquake detector 5 and signals or initiates the alarm module 40 when any oscillatory movement with amplitude or magnitude of the measured movement is greater than the first threshold set level 105. The special and custom operating software loaded into the read only memory of the microprocessor, integrated circuit, or chip 20 is a substantial part of this invention because it automatically calibrates the earthquake detector 5 to provide reliable earthquake or seismic wave detection.

Alternately, the calibration function may be performed manually where calibration control 60 is an adjustable sensitivity control that is manually adjusted or calibrated to the average amplitude or magnitude of the measured movement in one, two, or three dimensions of the background oscillations which prevents the alarm module from initiating with readings at or below this level of background oscillations or background noise. Adjustable sensitivity control may be a series of switches to allow for the selection of: the building type, such as high-rise versus low rise; type of structure, such as masonry, reinforced concrete, wood frame, steel frame, etcetera; selection of the average wind loading; location on the earth; or any other similar characteristic. The series of switches is two or more switches positioned in series wherein each switch may be set at two or more designated positions that mark a separate position for the switch. Adjustable sensitivity control may be one switch to allow for the selection of: degree of oscillatory motion, such as large, medium, small, or any other scale. Adjustable sensitivity control may be a series of switches to allow for the selection of: separate degrees of oscillatory motion in a plurality certain designated bandwidths or frequencies of oscillatory motion. The series of switches is two or more switches positioned in series wherein each switch may be slid to two or more designated positions that mark a separate position for the switch. With the manually calibration method and calibration control 60, the user of earthquake detector 5 must properly set the switch or series of switches so that the earthquake detector 5 can operate for a period of time such as one hour where there has not been any unusual seismic waves and the alarm module 40 has not been initiated. In best mode, manual calibration control 60 adjusts and sets a band pass filter or step function filter for each dimension measured where that band pass level or amplitude of the step function is set at the first threshold set level 105.

Earthquake detector 5 further comprises: a case or housing 80. Case or housing 80 is a rigid shell, encasement, or housing with an exterior and an interior. Case or housing 80 functions to contain and protect the electronic equipment of earthquake detector 5. Case or housing 80 contains circuit board 10, microprocessor, integrated circuit, or chip 20, and accelerometer integrated circuit or chip 30. Alarm module 40 is located on the exterior of case or housing 80 so that the use may access this control. Embodiments with a terminal block or terminal connector 52 have the terminal block or terminal connector 52 located on the exterior of case or housing 80. Embodiments with a power cord 54 and a plug for an electrical outlet 56 have these items located on the exterior of case or housing 80. Embodiments with a battery 58 have the battery 58 located in the interior of case or housing 80. Calibration control 60 is located on the exterior of case or housing 80 to allow user access to this control.

Earthquake detector 5 may further comprise: a network connection or modem 70. Network connection or modem 70 is a hardware device that converts data into a format suitable for a transmission medium so that it can be transmitted from one computer to another. There are several different types and brands of modem in the prior art such as: a Wi-Fi modem, Bluetooth modem, cellular modem, optical modem, or similar. Any known type or brand of modem may be used with this invention. Network connection or modem 70 is attached to or connected to circuit board 10 so that there is electrical continuity between these members. Network connection or modem 70 functions to provide communication between the microprocessor, integrated circuit, or chip 20 and other computers or microprocessors in the world. This communication link allows for exterior control or calibration of the earthquake detector 5 from a smartphone or a computer that is exterior to the earthquake detector 5. With this mode, the user may operate, reset, initialize, and calibrate earthquake detector 5 from a smartphone or computer rather than by physical controls on the earthquake detector 5. With this mode, the earthquake detector 5 may transmit data to a smartphone or computer for external storage and analysis, primarily for historical and research purposes. With this mode, the earthquake detector 5 may also be updated or reprogrammed with improved software that is downloaded into the earthquake detector 5 from an external smartphone or computer.

What is claimed is:

1. An earthquake detector comprising: a circuit board; a microprocessor, integrated circuit, or chip; an accelerometer integrated circuit or chip; an alarm module; a connection to a power source; and a calibration control, wherein, said circuit board is a printed circuit board, said microprocessor, integrated circuit, or chip is an integrated circuit or a microchip loaded with a special and custom operating software, said microprocessor, integrated circuit, or chip is attached to or connected to said circuit board, said accelerometer integrated circuit or chip is an accelerometer or device that measures acceleration and produces output readings of the measured acceleration and is attached to or connected to said circuit board, said alarm module is an audible alarm that emits sound waves and/or a visual alarm that emits light that is attached to or connected to said circuit board, said connection to power source is an electrical connection to a power source that provides electrical continuity between said circuit board and said power source, said special and custom operating software continuously monitors said accelerometer integrated circuit or chip and continuously obtains an acceleration reading in an x-dimension Ax from said accelerometer integrated circuit or chip at a sample rate of $\Delta t = 2-50$ milliseconds and performs the following process, a) said special and custom operating software obtains an acceleration reading from said accelerometer integrated circuit or chip in said x-dimension at time=t−2 and stores said acceleration reading as Ax(t−2), b) said special and custom operating software obtains an acceleration reading from said accelerometer integrated circuit or chip in said x-dimension at time=t−1 and stores said acceleration reading as Ax(t−1), c) said special and custom operating software calculates a time derivative of acceleration in said x-dimension for time=(t−2) to (t−1) with the equation A'x(t−1)=(Ax(t−1)−Ax(t−2)/((t−1)−(t−2)) and stores said time derivative of acceleration in said x-dimension for time=(t−2) to (t−1) as A'x(t−1), d) said special and custom operating software calculates $a_x(t)$ estimated with the equation $a_x(t)$ estimated=Ax(t−1)+A'x(t−1)*($\Delta t$) and stores said $a_x(t)$ estimated as $a_x(t)$ estimated, e) said special and custom operating software obtains an acceleration reading from said accelerometer integrated circuit or chip in said x−dimension at time=t and stores said acceleration reading as Ax(t), f) said special and custom operating software compares Ax(t) to $a_x(t)$ estimated, if Ax(t) is greater than 105 percent of $a_x(t)$ estimated then said special and custom operating software sets Ax(t) equal to $a_x(t)$ estimated and sets a variable called Estimate Used=Yes, else said special and custom operating software leaves Ax(t) as is and sets a variable called Estimate Used=No, g) said special and custom operating software calculates velocity in said x-dimension for time=(t−2) to (t−1) during each iteration with the equation Vx(t−1)=(Ax(t−2)+Ax(t−1))/2)*($\Delta t$), h) said special and custom operating software calculates velocity in said x-dimension for time=(t−1) to (t) during each iteration with the equation Vx(t)=Ax(t−1)+Ax(t))/2)*($\Delta t$), i) said special and custom operating software calculates displacement in said x-dimension for time=(t−1) to (t) during each iteration with the equation Dx(t)=(Vx(t−1)+Vx(t))/2)*($\Delta t$)], j) said special and custom operating software compares Ax(t), Vx(t), and Dx(t) to an Ax(alarm), a Vx(alarm), or a Dx(alarm) respectively, k) if Ax(t)>Ax(alarm) and Estimate Used=No, then an earthquake is detected and said special and custom operating software causes said alarm module to emit sound waves and/or emit light, l) if Vx(t)>Vx(alarm) and Estimate Used=No, then an earthquake is detected and said special and custom operating software causes said alarm module to emit sound waves and/or emit light, m) if Dx(t)>Dx(alarm) and Estimate Used=No, then an earthquake is detected and said special and custom operating software causes said alarm module to emit sound waves and/or emit light, n) if Ax(t)>Ax(alarm) and Estimate Used=Yes, then said special and custom operating software obtains an acceleration reading from said accelerometer integrated circuit or chip in said x-dimension at time=t+1 and repeats said steps a through q, o) if Vx(t)>Vx(alarm) and Estimate Used=Yes, then said special and custom operating software obtains an acceleration reading from said accelerometer integrated circuit or chip in said x-dimension at time=t+1 and repeats said steps a through q, p) if Dx(t)>Dx(alarm) and Estimate Used=Yes, then said special and custom operating software obtains an acceleration reading from said accelerometer integrated circuit or chip in said x-dimension at time=t+1 and repeats said steps a through q, and q) if Ax(t)<=Ax(alarm), Vx(t)<=Vx(alarm), and Dx(t)<=Dx(alarm), then said special and custom operating software obtains an acceleration reading from said accelerometer integrated circuit or chip in said x-dimension at time=t+1 and repeats said steps a through q.

2. An earthquake detector as recited in claim 1 further comprising: a network connection or modem, wherein said network connection or modem is a hardware device that is attached to or connected to said circuit board that converts data into a format suitable for a transmission medium.

3. An earthquake detector comprising: a circuit board; a microprocessor, integrated circuit, or chip; an accelerometer integrated circuit or chip; an alarm module; a connection to a power source; and a calibration control, wherein, said circuit board is a printed circuit board, said microprocessor, integrated circuit, or chip is an integrated circuit or a microchip loaded with a special and custom operating software, said microprocessor, integrated circuit, or chip is attached to or connected to said circuit board, said accelerometer integrated circuit or chip is an accelerometer or device that measures acceleration and produces output readings of the measured acceleration, said alarm module is an audible alarm that emits sound waves and/or a visual alarm that emits light that is attached to or connected to said circuit board, said connection to power source is an electrical connection to a power source that provides electrical continuity between said circuit board and said power source, said special and custom operating software continuously monitors said accelerometer integrated circuit or chip and continuously obtains an acceleration reading in a y-dimension Ay from said accelerometer integrated circuit or chip at a sample rate of $\Delta t=2\text{-}50$ milliseconds and performs the following process, a) said special and custom operating software obtains an acceleration reading from said accelerometer integrated circuit or chip in said y-dimension at time=t−2 and stores said acceleration reading as Ay(t−2), b) said special and custom operating software obtains an acceleration reading from said accelerometer integrated circuit or chip in said y-dimension at time=t−1 and stores said acceleration reading as Ay(t−1), c) said special and custom operating software calculates a time derivative of acceleration in said y-dimension for time=(t−2) to (t−1) with the equation A'y(t−1)=(Ay(t−1)−Ay(t−2)/((t−1)−(t−2)) and stores said time derivative of acceleration in said y-dimension for time=(t−2) to (t−1) as A'y(t−1), d) said special and custom operating software calculates $a_y(t)$ estimated with the equation $a_y(t)$ estimated=Ay(t−1)+A'y(t−1)*($\Delta t$) and stores said $a_y(t)$ estimated as $a_y(t)$ estimated, e) said special and custom operating software obtains an acceleration reading from said accelerometer integrated circuit or chip in said y-dimension at time=t and stores said acceleration reading as Ay(t), f) said special and custom operating software compares Ay(t) to $a_y(t)$ estimated, if Ay(t) is greater than 105 percent of $a_y(t)$ estimated then said special and custom operating software sets Ay(t) equal to $a_y(t)$ estimated and sets a variable called Estimate Used=Yes, else said special and custom operating software leaves Ay(t) as is and sets a variable called Estimate Used=No, g) said special and custom operating software calculates velocity in said y-dimension for time=(t−2) to (t−1) during each iteration with the equation Vy(t−1)=(Ay(t−2)+Ay(t−1))/2)*($\Delta t$), h) said special and custom operating software calculates velocity in said y-dimension for time=(t−1) to (t) during each iteration with the equation Vy(t)=(Ay(t−1)+Ay(t))/2)*($\Delta t$), i) said special and custom operating software calculates displacement in said y-dimension for time=(t−1) to (t) during each iteration with the equation Dy(t)=(Vy(t−1)+Vy(t))/2)*($\Delta t$)], j) said special and custom operating software compares Ay(t), Vy (t), and Dy (t) to an Ay(alarm), a Vy(alarm), or a Dy(alarm) respectively, k) if Ay(t)>Ay(alarm) and Estimate Used=No, then an earthquake is detected and said special and custom operating software causes said alarm module to emit sound waves and/or emit light, l) if Vy(t)>Vy(alarm) and Estimate Used=No, then an earthquake is detected and said special and custom operating software causes said alarm module to emit sound waves and/or emit light, m) if Dy(t)>Dy(alarm) and Estimate Used=No, then an earthquake is detected and said special and custom operating software causes said alarm module to emit sound waves and/or emit light, n) if Ay(t)>Ay(alarm) and Estimate Used=Yes, then said special and custom operating software obtains an acceleration reading from said accelerometer integrated circuit or chip in said y-dimension at time=t+1 and repeats said steps a through q, o) if Vy(t)>Vy(alarm) and Estimate Used=Yes, then said special and custom operating software obtains an acceleration reading from said accelerometer integrated circuit or chip in said y-dimension at time=t+1 and repeats said steps a through q, p) if Dy(t)>Dy(alarm) and Estimate Used=Yes, then said special and custom operating software obtains an acceleration reading from said accelerometer integrated circuit or chip in said y-dimension at time=t+1 and repeats said steps a through q, and q) if Ay(t)<=Ay(alarm), Vy(t)<=Vy(alarm), and Dy(t)<=Dy(alarm), then said special and custom operating software obtains an acceleration reading from said accelerometer integrated circuit or chip in said y-dimension at time=t+1 and repeats said steps a through q.

4. An earthquake detector as recited in claim 3 further comprising: a network connection or modem, wherein said network connection or modem is a hardware device that is attached to or connected to said circuit board that converts data into a format suitable for a transmission medium.

5. An earthquake detector comprising: a circuit board; a microprocessor, integrated circuit, or chip; an accelerometer integrated circuit or chip; an alarm module; a connection to a power source; and a calibration control, wherein, said circuit board is a printed circuit board, said microprocessor, integrated circuit, or chip is an integrated circuit or a microchip loaded with a special and custom operating software, said microprocessor, integrated circuit, or chip is attached to or connected to said circuit board, said accelerometer integrated circuit or chip is an accelerometer or device that measures acceleration and produces output readings of the measured acceleration, said alarm module is an audible alarm that emits sound waves and/or a visual alarm that emits light that is attached to or connected to said circuit board, said connection to power source is an electrical connection to a power source that provides electrical continuity between said circuit board and said power source, said special and custom operating software continuously monitors said accelerometer integrated circuit or chip and continuously obtains an acceleration reading in a z-dimension Az from said accelerometer integrated circuit or chip at a sample rate of $\Delta t=2\text{-}50$ milliseconds and performs the following process, a) said special and custom operating software obtains an acceleration reading from said accelerometer integrated circuit or chip in said z-dimension at time=t−2 and stores said acceleration reading as Az(t−2), b) said special and custom operating software obtains an acceleration reading from said accelerometer integrated circuit or chip in said z-dimension at time=t−1 and stores said acceleration reading as Az(t−1), c) said special and custom operating software calculates a time derivative of acceleration in said z-dimension for time=(t−2) to (t−1) with the equation A'$_z$(t−1)=(Az(t−1)−Az(t−2)/((t−1)−(t−2)) and stores said time derivative of acceleration in said z-dimension for time=(t−2) to (t−1) as A'z(t−1), d) said special and custom operating software calculates $a_z(t)$ estimated with the equation $a_z(t)$ estimated=Az(t−1)+A'z(t−1)*($\Delta t$) and stores said $a_z(t)$ estimated as $a_z(t)$ estimated, e) said special and custom operating software obtains an acceleration reading from said accelerometer integrated circuit or chip in said z-dimension at time=t and stores said acceleration reading as Az(t), f) said special and custom operating software compares Az(t) to $a_z(t)$ estimated, if Az(t) is greater than 105 percent of $a_z(t)$ estimated then said special and custom operating software sets Az(t) equal to $a_z(t)$ estimated and sets a variable called Estimate Used=Yes, else said special and custom operating software leaves Az(t) as is and sets a variable called Estimate Used=No, g) said special and custom operating software calculates velocity in said z-dimension for time=(t−2) to (t−1) during each iteration with the equation Vz(t−1)=(Az(t−2)+Az(t−1))/2)*(Δt), h) said special and custom operating software calculates velocity in said z-dimension for time=(t−1) to (t) during each iteration with the equation Vz(t)=(Az(t−1)+Az(t))/2)*(Δt), i) said special and custom operating software calculates displacement in said z-dimension for time=(t−1) to (t) during each iteration with the equation Dz(t)=(Vz(t−1)+Vz(t))/2)*(Δt), j) said special and custom operating software compares Az(t), Vz(t), and Dz(t) to an Az(alarm), a Vz(alarm), or a Dz(alarm) respectively, k) if Az(t)>Az(alarm) and Estimate Used=No, then an earthquake is detected and said special and custom operating software causes said alarm module to emit sound waves and/or emit light, l) if Vz(t)>Vz(alarm) and Estimate Used=No, then an earthquake is detected and said special and custom operating software causes said alarm module to emit sound waves and/or emit light, m) if Dz(t)>Dz(alarm) and Estimate Used=No, then an earthquake is detected and said special and custom operating software causes said alarm module to emit sound waves and/or emit light, n) if Az(t)>Az(alarm) and Estimate Used=Yes, then said special and custom operating software obtains an acceleration reading from said accelerometer integrated circuit or chip in said z-dimension at time=t+1 and repeats said steps a through q, o) if Vz(t)>Vz(alarm) and Estimate Used=Yes, then said special and custom operating software obtains an acceleration reading from said accelerometer integrated circuit or chip in said z-dimension at time=t+1 and repeats said steps a through q, p) if Dz(t)>Dz(alarm) and Estimate Used=Yes, then said special and custom operating software obtains an acceleration reading from said accelerometer integrated circuit or chip in said z-dimension at time=t+1 and repeats said steps a through q, and q) if Az(t)<=Az(alarm), Vz(t)<=Vz(alarm), and Dz(t)<=Dz(alarm), then said special and custom operating software obtains an acceleration reading from said accelerometer integrated circuit or chip in said z-dimension at time=t+1 and repeats said steps a through q.

6. An earthquake detector as recited in claim 5 further comprising: a network connection or modem, wherein said network connection or modem is a hardware device that is attached to or connected to said circuit board that converts data into a format suitable for a transmission medium.

* * * * *